United States Patent [19]

Mallon

[11] Patent Number: 4,480,072

[45] Date of Patent: Oct. 30, 1984

[54] USE OF ETHYL SILICATE AS A CROSSLINKER FOR HYDROXYLATED POLYMERS

[75] Inventor: Charles B. Mallon, Belle Mead, N.J.

[73] Assignee: Union Carbide Corporation, Danbury, Conn.

[21] Appl. No.: 527,832

[22] Filed: Aug. 30, 1983

Related U.S. Application Data

[63] Continuation-in-part of Ser. No. 356,783, Mar. 10, 1982, abandoned.

[51] Int. Cl.³ .............................................. C08F 8/00
[52] U.S. Cl. ..................................... 525/61; 525/342; 525/446; 525/523
[58] Field of Search ................. 525/61, 342, 523, 446

[56] References Cited

U.S. PATENT DOCUMENTS

| | | | |
|---|---|---|---|
| 2,432,113 | 12/1947 | Marks et al. | 88/65 |
| 2,456,251 | 12/1948 | Boughton et al. | 154/2.6 |
| 2,487,063 | 11/1949 | Marks et al. | 88/65 |
| 3,624,014 | 11/1971 | Moore et al. | 117/161 |
| 3,959,242 | 5/1976 | Watts et al. | 525/342 |
| 4,172,187 | 10/1979 | Fabel | 525/342 |

*Primary Examiner*—Joseph L. Schofer
*Assistant Examiner*—Bernard Lipman
*Attorney, Agent, or Firm*—Bernard Francis Crowe

[57] ABSTRACT

The solvent resistance, flexibility and hardness of various hydroxylated polymers is enhanced by crosslinking with alkyl silicates or their hydrolyzed condensates.

10 Claims, No Drawings

USE OF ETHYL SILICATE AS A CROSSLINKER FOR HYDROXYLATED POLYMERS

This is a continuation-in-part of Ser. No. 356,783 filed Mar. 10, 1982, now abandoned.

BACKGROUND OF THE INVENTION

This invention pertains to ethyl silicate or its hydrolyzates and more particularly to hydroxyl-containing polymers crosslinked with them.

BACKGROUND ART

The preparation of polyvinyl butyral/ethyl silicate condensation products is disclosed in U.S. Pat. No. 2,432,113. The purpose here was to provide a silicate coating on a polarizing sheet of polyvinyl butyral by impregnating the sheet with tetraethyl orthsilicate.

In U.S. Pat. No. 2,456,251 a binder for binding mica flakes to each other was produced by incorporating a minor amount of ethyl silicate in a resinous binder material having as its a base one or more resins selected from the group consisting of polymerized vinyl acetate, partially hydrolyzed polymerized vinyl acetate, polymerized acrylic ester resins and polymerized styrene resins.

In U.S. Pat. No. 2,487,063, a polarizing composite similar to that disclosed in U.S. Pat. No. 2,432,113 was described comprising a stretched iodo-polyvinyl butyral silicate.

U.S. Pat. No. 3,642,014 teaches the preparation of stable polymeric gels as reaction products of tetralkyl ortho-silicates and hydroxy terminated diene polymers.

It is an object of this invention to provide solvent resistant versions of presently existing polymers having numerous attributes but poor solvent resistance.

It is another object of this invention to provide a method for introducing flexibility into low molecular weight resins.

It is still a further object of this invention to impart hardness to presently used coatings resins.

Disclosure of Invention

It has been found that alkyl silicates or their hydrolyzates may be used to improve the solvent resistance, flexibility, hardness and other mechanical properties of certain hydroxyl-containing polymers by crosslinking them. Suitable hydroxyl-containing polymers susceptible to this treatment include hydroxyalkyl acrylic or methacrylic acid ester copolymers having 2 to 4 carbons in the alkyl group, polyester polyol polymers derived from organic carboxylic acids and polyhydric alcohols which reaction products contain at least two hydroxyl groups (as alcoholic OH) per molecular, and cyclic ester polymers containing at least two hydroxyl groups per molecule prepared from epsilon caprolactone or other lactones and the copolymers of such lactones with polyhydric alcohols, vinyl chloride/vinyl acetate/vinyl alcohol terpolymers, which are prepared by first copolymerizing vinyl chloride with acetate in various proportions and then partially hydrolyzing the resultant copolymer to afford a terpolymer containing vinyl chloride, vinyl acetate, and vinyl alcohol moieties, thermoplastic polyhydroxyethers, described in U.S. Pat. No. 3,356,646, hydroxylated acrylic copolymers and vinyl chloride/vinyl acetate/hydroxyalkyl acrylate terpolymers having relatively low molecular weights.

Suitable vinyl chloride/vinyl acetate/vinyl alcohol terpolymers include those having between about 10 and 90 percent vinyl acetate and about 5 to 50 weight percent vinyl alcohol copolymerized therein having molecular weights represented by inherent viscosities of about 0.05 to about 1.0 measured as 0.2 gram samples in 100 ml of cyclohexanone at 30° C. according to ASTM Method D 1243, and the like.

Representative hydroxylated acrylic copolymers include those containing hydroxyethyl, hydroxypropyl, or hydroxybutyl acrylate or methacrylate copolymerized esters having 1 to about 18 carbons in the alkyl moiety and, optionally, acrylic or methacrylic acid.

Typical of the polyfunctional organic carboxylic acids that can be employed in producing polyester polyols useful in this invention are: dicarboxylic aliphatic acids such as succinic, adipic, sebacic, azelaic, glutaric, pimelic, malonic and suberic acids; and dicarboxylic aromatic acids such as phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anyhydrides of any of these various acids can be employed in producing the polyester polyols.

The polyhydric alcohols (organic polyols) that can be employed in producing the polyester polyol starting material useful in this invention include the monomeric polyhydric alcohols such as, for example, glycerol; 1,2,6-hexanetriol; ethylene glycol; diethylene glycol; trimethylol propane; trimethyolethane; pentaerythritol; propylene glycol; 1,2-, 1,3- and 1,4-butylene glycols; 1,5-pentanediol; sorbitol; and the like, including mixtures thereof.

Other polyhydric alcohols that can be employed in producing the polyester polyols useful in this invention are the polymeric polyhydric alcohols which include the linear and branched chain polyethers having a plurality of acyclic ether oxygens and at least two alcoholic hydroxyl radicals. Illustrative of such polyether polyols are the poly(oxyalkylene) polyols containing one or more chains of connected oxyalkylene radicals which are prepared by the reaction of one or more alkylene oxides with acyclic and alicyclic polyols. Examples of the poly(oxyalkylene) polyols include the poly(oxyethylene) glycols prepared by the addition of ethylene oxide to water, ethylene glycol or diethylene glycol; poly(oxypropylene) glycols prepared by the addition of propylene oxide to water, propylene glycol or dipropylene glycol; mixed oxyethylene-oxypropylene polyglycols prepared in a similar manner utilizing a mixture of ethylene oxide or a sequential addition of ethylene oxide and propylene oxide; and the poly(oxybutylene) glycols and copolymers such as poly(oxyethylene-oxybutylene) glycols and poly(oxypropylene-oxybutylene) glycols. Included in the term "poly(oxybutylene) glycols" are polymers of 1,2-butyleneoxide and 2,3-butyleneoxide.

Illustrative of further polyester polyols are the reaction products of any of the aforesaid polycarboxylic acids and the polyhydric alcohols prepared by the reaction of one or more alkylene oxides such as ethylene oxide, propylene oxide, butylene oxide and mixtures thereof, with any of the following: glycerol; trimethylolpropane; 1,2,6-hexanetriol; pentaerythritol; sorbitol; glycosides such as methyl, ethyl, propyl, butyl and 2-ethylhexyl arabinoside, xyloside, fructoside, glucoside, and rhammoside, sucrose, mononuclear polyhydroxybenzenes such as resorcinol, pyrogallol, phloroglucinol, hydroquinone, 4,6-di-tertiarybutylcatechol, and catechol; polynuclear hydroxybenzenes ("polynuclear" designating at least two benzene nuclei) such as the di-, tri- and tetraphenylol compounds in which two to four hydroxybenzene groups are attached either directly by means of single bonds or through an aliphatic hydrocarbon radical containing one to twelve carbon atoms, such compounds being typically illustrated by 2,2-bis(p-hydroxyphenyl)-propane, bis(p-hydroxyphenyl)-methane and the various diphenols and diphenol methanes disclosed in U.S. Pat. Nos. 2,506,486 and 2,744,882, respectively. Another type of polyester polyol is that produced by reaction of a polycarboxylic acid and the polyether adducts formed by reaction of ethylene oxide, propylene oxide or butylene oxide with phenol-formaldehyde condensation products such as the novolaks.

Suitable vinyl chloride/vinyl acetate/hydroxyalkyl acrylates include those containing about 10 to about 80 weight percent vinyl acetate and about 5 to about 50 percent by weight of hydroxyalkyl acrylate. Preferred hydroxyalkyl acrylates are hydroxyethyl acrylate, hydroxypropyl acrylate, hydroxybutyl acrylate and the like. These low molecular weight polymers have inherent viscosities in the range of about 0.05 to about 1.0 when measured as a 0.2 gram sample in cyclohexanone at 30° C.

Although other alkyl silicates can be used in this invention, the preferred alkyl silicate is ethyl silicate in the form of the monomer tetraethyl orthosilicate (TEOS) or its hydrolyzates. Alkoxyalkyl silicates can also be used if preferred. Alkyl silicates are produced by the reaction of silicon tetrachloride and alcohols or alkoxy alcohols, generally in a reactor equipped with a stirrer, condenser and vat scrubber. The hydrogen chloride by-product is removed by reflux which may be carried out at reduced or atmospheric pressure. Through this process, the most common products TEOS and Cellosolve (Trademark of Union Carbide Corporation for monoalkyl ethers of ethylene glycol) silicate are made.

Subsequently, these products may be hydrolyzed by the addition of water and an acid catalyst. The amount of water added determines the degree of hydrolysis in the final product. Commercially available products derived from ethanol include the unhydrolyzed TEOS, condensed Ethyl Silicate (about 7 percent hydrolysis), Ethyl Silicate 40 (40 percent hydrolysis containing 40 percent $SiO_2$), and ethyl silicate having an 80 to 85 percent hydrolysis level.

A trace of acid is necessary to catalyze the crosslinking reaction. The term "trace" is use herein to mean at least about 0.01 weight percent based on the weight of the hydroxyl-containing polymers. Thermoplastic polyhydroxyether resins are a family of amorphous, high molecular weight phenoxy resins derived from diphenols and epichlorohydrin. A commercially available polyhydroxyether is Phenoxy PKHH (Trade designation for a resin sold by Union Carbide Corporation derived from Bisphenol-A and epichlorohydrin having a degree of polymerization of about 100 and average molecular weight of at least about 20,000).

The crosslinking of the hydroxylated polymers with the silicates involves simply the addition of an alkyl silicate or one of its hydrolyzates to a solution of the polymer in the presence of a trace quantity of acid, followed by the removing of solvent and curing of the resultant product at elevated temperature. Since addition of acid to solutions of hydroxylated polymers and TEOS or ES-40 results in gelation, it is preferred to add the acid as the last component.

The invention is further described in the examples which follow. All parts and percentages are by weight unless otherwise specified.

Control A

A solution of a vinyl chloride/vinyl acetate/hydroxypropyl acrylate terpolymer (containing about 20 perocent hydroxypropyl acrylate and about 10 percent of vinyl acetate by weight) at a concentration of 23% by weight in methyl ethyl ketone (MEK) was prepared for use as a reference sample. The solution was applied to a 4×12 inch Q panel and allowed to air dry for 30 minutes. Then the coated panel was baked for 20-30 minutes at 130° C. The resulting coating, approximately 1 mil thick, was tested for solvent resistance by the MEK double rub test and for flexibility by the falling dart direct impact test. The sample was rated at 10 MEK double rubs and 8 in. lbs. direct impact.

EXAMPLE 1

To 13 g of the solution of hydroxylated vinyl resin prepared as above in Control A were added: tetraethyl orthosilicate (TEOS, 1 gram) and a trace of sulfuric acid (about 0.01 gram). The solution was coated on a Q Panel to provide a 1 mil dry film, air dried, and baked at 130° C. for 20-30 minutes. Evaluation of the cured coating showed excellent solvent resistance (greater than 100 MEK double rubs) and excellent flexibility (greater than 80 in. lbs. direct impact). These results demonstrate the dramatic improvement in properties resulting from crosslinking of the hydroxylated vinyl resin film with ethyl silicate.

EXAMPLES 2-4

Example 1 was repeated with the exception that the hydroxylated vinyl resin/TEOS ratios were 6, 1.5 and 3, respectively. Coatings prepared as in Example 1 from these solutions had excellent solvent resistance (all were greater than 100 MEK double rubs) and excellent flexibility (direct impact was greater than 80, 78 and 80 in. lbs., respectively). This demonstrates that the hydroxylated vinyl resin/TESO ratio is not critical with regard to attainment of excellent properties. These data are delineated in Table I.

(Note that a ratio of 3/1 provides roughly 1 TEOS molecule for every —OH in the polymer.)

EXAMPLES 5-8

These examples were prepared from combinations of a 23 percent solution of hydroxylated vinyl resin in MEK and a solution of 85 percent hydrolyzed ES-40 in isopropanol with a silica content of 20 percent. Examples 5,6,7 and 8 were composed of the following ratios of the hydroxylated vinyl resin/hydrolyzed ES-40 solutions; 90/10, 83/17, 67/83, 50/50. Coatings were prepared, cured and tested as in the Example 1 with the following results: MEK double rubs: all greater than 100; direct impact: greater than 80, 78, 48 and 8 in. lbs. In addition, it should be noted that samples 6 and 7 exhibited a slight haze in the film, while Example 8 had a ribbed, opaque appearance. These results, summarized in Table II, indicate that hydrolyzed ethyl silicate can be used to crosslink hydroxylated vinyl resin but that as the quantity of crosslinking agent increases, some incompatibility becomes noticeable. This does not necessarily detract from the usefulness of the crosslinked films.

Control B

As a reference sample, a solution of Phenoxy PKHH in tetrahydrofuran (THF) was coated on to a steel panel, dried and baked as in Example 1. The evaluations for solvent resistance, impact and hardness gave these results: MEK double rubs: 9; direct impact: greater than 80 in. lbs.; pencil hardness: 3B.

EXAMPLES 9-11

These samples were prepared by addition of the following reagents to a 20 percent solution of Phenoxy PKHH (20 grams in THF): ethyl silicate (1 gram); ES-40 (0.7 grams); 80 percent hydrolyzed ES-40 with a silica content of 20 percent (1.4 grams). A trace of sulfuric acid was added to each sample and the coatings prepared and cured as in Example 1. The properties were evaluated with the following results: MEK double rubs; all greater than 100; direct impact: all greater than 80; pencil hardness: H, HB, HB. In addition, a slight haze was noticed in films from Examples 10 and 11 while Example 9 produced a clear film. These results, compared in Table III with those in control B, demonstrate that ethyl silicate and its hydrolyzates are effective crosslinkers for Phenoxy PKHH.

Control C

An hydroxylated acrylic polymer was prepared by addition of a solution containing ethyl acrylate (35 grams), methyl methacrylate (45 grams), hydroxypropyl methacrylate (20 grams), azobisisobutyronitrile (AIBN, 1 gram), t-dodecylmercaptan (0.5 grams) and MEK (100 grams) to a refluxing solution of AIBN (0.5 grams) in MEK (200 grams) over a 3 hour period. Heating was continued for an additional 2.5 hours to insure polymerization of most of the monomers. A coating from this solution was prepared for use as a reference sample and exhibited the following properties: MEK double rubs: 3; direct impact; 10 in. lbs.; pencil hardness: H.

EXAMPLE 12

Ethyl silicate (3.2 grams) was added to the polymer solution prepared in Control C (11 grams) along with a trace of sulfuric acid. A coating was prepared from this solution as described in Example 1 and evaluated for solvent resistance, direct impact and hardness. The results were as follows: MEK double rubs: greater than 100; direct impact: 30 in. lbs.; pencil hardness: 3 H. These results, when compared in Table IV with those of Control C, clearly show the beneficial effect of crosslinking this hydroxylated acrylic polymer with ethyl silicate.

TABLE I

| Components | Control A | Example 2 | Example 3 | Example 4 |
|---|---|---|---|---|
| Vinyl Chloride Polymer[a] | 3 g. | 3 g. | 3 g. | 3 g. |
| TEOS | — | 1 g. | 0.5 g. | 2 g. |
| MEK | 10 g. | 10 g. | 10 g. | 10 g. |
| Acid[3] | — | Trace | Trace | Trace |
| Properties[2] | | | | |
| MEK Double Rubs | 10 | 100+ | 100+ | 100+ |
| Direct Impact (in. lbs.) | 8 | 80+ | 80+ | 78 |
| Pencil Hardness | F | F | F | HB |

[1]TEOS is tetraethyl orthosilicate
[2]Properties measured on 1 mil dry films on steel Q panels after baking 20-30 minutes at 130° C.
[3]Acids used were sulfuric or benzoic.
[a]Vinyl chloride/vinyl acetate/hydroxypropyl acrylate terpolymer containing 67% vinyl chloride; 10% vinyl acetate and 20% hydroxypropyl acrylate copolymerized therein.

TABLE II

| Components | Example 5 | Example 6 | Example 7 | Example 8 |
|---|---|---|---|---|
| Vinyl Chloride Polymer[a] | 1 g. | 1 g. | 1 g. | 1 g. |
| 80% Hydrolyzed ES-40, 20% SiO$_2$ Content | 0.5 g. | 1 g. | 2 g. | 5 g. |
| MEK | 3.5 g. | 3.3 g. | 3.3 g. | 3.3 g. |
| Properties[2] | | | | |
| MEK Double Rubs | 100+ | 100+ | 100+ | 100+ |
| Direct Impact (in. lbs.) | 80+ | 78+ | 48+ | 8 |
| Pencil Hardness | B | HB | 2B | 2B |
| Appearance | Clear | Very Slight Haze | Slight Haze | Ribbed, Opaque |

[1]Properties measured on 1 mil dry films on steel Q panels after baking 20-30 minutes at 130° C.

TABLE III
PHENOXY PKHH CROSSLINKED WITH ETHYL SILICATE

| Components | Control B | Example 9 | Example 10 | Example 11 |
|---|---|---|---|---|
| Phenoxy PKHH | 4 g. | 4 g. | 4 g. | 4 g. |
| TEOS | None | 1 g. | — | — |
| ES-40 | None | — | 0.7 g. | — |
| 80% Hydrolyzed ES-40 (20% SiO$_2$) | None | — | — | 1.4 g. |
| THF | 16 g. | 16 g. | 16 g. | 16 g. |
| H$_2$SO$_4$ | None | 0.01 g. | 0.01 g. | 0.01 g. |
| Properties[1] | | | | |
| MEK Double Rubs | 9 | 100+ | 100+ | 100+ |
| Direct Impact (in.-lbs.) | 80+ | 80+ | 80+ | 80+ |
| Pencil Hardness | 3B | H | HB | HB |
| Appearance | Clear | Clear | Hazy | Hazy |

[1]Properties measured on 1 mil dry films on steel Q panels after baking 20-30 minutes at 130° C.

TABLE IV
ACRYLIC POLYMER[1] CROSSLINKED WITH ETHYL SILICATE

| Component | Control C | Example 12 |
|---|---|---|
| Acrylic Polymer | 11 g. | 11 g. |
| TEOS | — | 3.2 g. |
| MEK | 39 g. | 39 g. |
| H$_2$SO$_4$ | — | 0.02 g. |
| Properties[2] | | |
| MEK Double Rubs | 3 | 100+ |
| Direct Impact (in.-lbs) | 10 | 30 |
| Pencil Hardness | H | 3H |

[1]Acrylic polymer composition: MMA/EA/HPMA-45/35/20, prepared at 22% (Total Solids) in MEK using AIBN initiator and t-dodecyl mercaptan as chain transfer agent.
[2]Properties measured on 1 mil dry films on steel Q panels after baking 20-30 minutes at 130° C.

TABLE V

CROSSLINKING OF POLYESTER WITH HYDROLYZED ES-40

| FORMULATION COMPONENTS | FORMULATION NUMBER | | | | | | | | |
|---|---|---|---|---|---|---|---|---|---|
| | 1 | 2 | 3 | 4 | 5 | 6 | 7 | 8 | 9 |
| POLYESTER POLYOL[1] | 10 g | 10 | 10 | 10 | 10 | 10 | 10 | 10 | 10 |
| MEK | 2 g | 2 | 2 | 2 | 2 | 2 | 2 | 2 | 2 |
| 80% HYDROLYZED ES-40 (SiO$_2$ CONTENT: 20%) | 2 g | 5 | 5 | 5 | 10 | 10 | 10 | 15 | 20 |
| H$_2$SO$_4$ | — | — | 1 DROP | 3 DROPS | — | 1 DROP | 3 DROPS | — | — |
| SOLIDS RATIO: POLYESTER POLYOL/SiO$_2$ | 95/5 | | 89/11 | | | 81/19 | | 74/26 | 68/32 |
| BAKE CONDITIONS: 135° C./30 MIN. PROPERTIES: | | | | | | | | | |
| MEK DOUBLE RUBS | 9 | 29 | 38 | 39 | 100+ | 76 | 100+ | 100+ | 100+ |
| PENCIL HARDNESS | 4B | 4B | 4B | 4B | 3B | F | F | B | B |
| BAKE CONDITIONS: 160° C./30 MIN. PROPERTIES: | | | | | | | | | |
| MEK DOUBLE RUBS | 18 | 60 | 85 | 90 | 100+ | 100+ | 100+ | 100+ | 100+ |
| PENCIL HARDNESS | 4B | 3B | 2B | 2B | 2H | H | 2H | H | F |

[1] A polyester polyol derived from isophthalic acid and trimethylol propane having an OH value of 152, an equivalent weight of 370, an acid number of 10 and a viscosity of Z4–Z6.

TABLE VI

CROSSLINKING OF ROHM AND HAAS AT-400 WITH HYDROLYZED ES-40

| FORMULATION COMPONENTS | FORMULATION NUMBER | | | | | | | | |
|---|---|---|---|---|---|---|---|---|---|
| | 1 | 2 | 3 | 4 | 5 | 6 | 7 | 8 | 9 |
| AT-400 | 47 g | 47 | 47 | 53 | 53 | 53 | 60 | 60 | 60 |
| MEK | 15 g | 15 | 15 | 15 | 15 | 15 | 15 | 15 | 15 |
| 80% HYDROLYZED ES-40 (SiO$_2$ CONTENT: 20%) | 15 g | 15 | 15 | 10 | 10 | 10 | 5 | 5 | 5 |
| p-TOLUENE SULFONIC ACID | 1.2 g | 0.3 | 0.1 | 1.2 | 0.3 | 0.1 | 1.2 | 0.3 | 0.1 |
| SOLIDS RATIO: AT-400/SiO$_2$ | | 92/8 | | | 95/5 | | | 98/2 | |
| BAKE CONDITIONS: 135° C./30 MIN. PROPERTIES: | | | | | | | | | |
| MEK DOUBLE RUBS | 25 | 100+ | 100+ | 18 | 40 | 90 | 15 | 10 | 25 |
| PENCIL HARDNESS | 4B | B | B | 4B | 4B | 4B | 4B | 4B | 4B |
| BAKE CONDITIONS: 200° C./30 MIN. PROPERTIES: | | | | | | | | | |
| MEK DOUBLE RUBS | 100+ | 100+ | 100+ | 100+ | 100+ | 100+ | 100+ | 100+ | 100+ |
| PENCIL HARDNESS | 4B | 4B | F | 4B | 4B | 4B | B | B | HB |

EXAMPLE 13

The procedure described in Example 1 was repeated with the exception that a polyester polyol derived from isophthalic acid and trimethylol propane was substituted for the hydroxylated vinyl resin and 80% hydrolyzed ES-40 was substituted for the TEOS. The formulations, curing conditions and properties of the baked polymers are delineated in Table V.

EXAMPLE 14

The procedure described in Example 1 was repeated except that the hydroxylated vinyl resin was replaced by Rohm and Haas AT-400, a copolymer of butyl acrylate, styrene, hydroxyethyl acrylate and acrylic or methacrylic acid (copolymerized therein in a weight ratio of 45:36:14:5 respectively), having a number average molecular weight of 2000, a weight average molecular weight of 17000, an acid number of 28 and an OH number of 86. 80% Hydrolyzed ES-40 was also substituted for the TEOS. The formulation, curing conditions and properties of the cured polymers are presented in Table VI.

Although the invention has been described in its preferred forms with a certain amount of particularity, it will be understood by those skilled in the art that the present disclosure has been made only by way of example and that numerous changes can be made without departing from the spirit and scope of the invention.

I claim:

1. Method of enhancing the solvent resistance, flexibility and hardness of hydroxylated polymers selected from the group consisting of hydrolized vinyl chloride/vinyl acetate copolymers, vinyl chloride/vinyl acetate/hydroxyalkyl acrylate copolymers, thermoplastic polyhydroxyethers derived from bisphenol A and epichlorohydrin, hydroxyalkyl acrylic or methacrylic acid polymers and polyester polyol polymers derived from organic carboxylic acids and polyhydric alcohols, which comprises blending said hydroxylated polymers with an alkyl silicate or alkyl silicate hydrolyzate in the presence of a trace amount of acid and thereafter curing the resultant mixture.

2. Method claim in claim 1 wherein the alkyl silicate is tetraethyl orthosilicate.

3. Method claim in claim 1 wherein the hydroxylated polymer is an hydrolyzed vinyl chloride/vinyl acetate.

4. Method claim in claim 1 wherein the hydroxylated polymer is a vinyl chloride/vinyl acetate/hydroxyalkyl acrylate terpolymer.

5. Method claimed in claim 1 wherein the hydroxylated polymer is a thermoplastic polyhydroxyether derived from bisphenol A and epichlorohydrin.

6. Method claimed in claim 1 wherein the hydroxylated polymer is an hydroxyalkyl acrylic or methacrylic acid polymer having 2 to 4 carbons in the alkyl group.

7. Method claimed in claim 1 wherein the hydroxylated polymer is a polyester polyol polymer derived from organic carboxylic acids and polyhydric alcohols.

8. Method claimed in claim 1 wherein the ratio of hydroxylated polymer to alkyl silicate is in the range of about 25:1 to about 1:1.

9. Method claimed in claim 1 wherein the alkyl silicate is ethyl silicate hydrolyzed to a degree of about 40 percent.

10. Method claimed in claim 1 wherein the alkyl silicate is ethyl silicate hydrolyzed to a degree of about 80 percent.

* * * * *